United States Patent [19]
Bassani

[11] 3,941,169
[45] Mar. 2, 1976

[54] MOLD INJECTION ADAPTER FOR LOW VISCOSITY POLYMERS

[75] Inventor: Giovanni Bassani, Midland, Mich.

[73] Assignee: Dow Corning Corporation, Midland, Mich.

[22] Filed: Dec. 30, 1974

[21] Appl. No.: 537,289

[52] U.S. Cl.................. 141/61; 141/82; 222/146 R
[51] Int. Cl.² .......................................... B65B 31/06
[58] Field of Search .............................. 141/37–66, 141/392, 82, 7; 222/146 H, 146 R

[56] References Cited
UNITED STATES PATENTS
3,380,488  4/1968  Herbst ................................. 141/49

*Primary Examiner*—Houston S. Bell, Jr.
*Attorney, Agent, or Firm*—Howard W. Hermann

[57] ABSTRACT

There is described herein a mold injection adapter for use with low viscosity polymers comprising a housing adapted to be urged into sealing relationship with the area around the mold inlet port and selective means in the housing for evacuating the mold cavity through the port and for injecting polymer into the port, as well as a fluid jacket for heating or cooling the polymer immediately prior to injection. The injecting means is disclosed as a pneumatically or hydraulically operated injection barrel containing a further pneumatically or hydraulically operated needle valve for controlling flow of polymer through the injection barrel and sealing the barrel during the evacuation step.

7 Claims, 5 Drawing Figures

MOLD INJECTION ADAPTER FOR LOW VISCOSITY POLYMERS

BACKGROUND OF THE INVENTION

The present invention relates to injection or transfer molding equipment and particularly to an adapter for use with low viscosity polymeric material, sometimes known as "liquid polymers."

There are presently known numerous chemically different types of polymer systems which are commonly molded by means of injection molding or transfer molding equipment. Most of these polymer systems, whether thermoset or thermoplastic, are at the time of introduction into the mold relatively viscous materials. As a result substantial pressures are required in the mold in order to completely fill the mold cavities with such materials. Further, it is also known that many of these conventional types of polymers require several compounding steps in order to add desired catalysts, fillers, or other additives. More recently, several types of multiple polymers have been produced in a low viscosity or so-called liquid form. These liquid systems allow elimination of much of the flash in molding and simplify design of mold runners as well as eliminating substantial compounding equipment prior to molding. For example, such liquid polymers have been suggested in epoxy formulations, silicone rubber formulations and other organic polymers. While specialized equipment has been developed for molding such liquid systems it is desirable, because many manufacturing facilities already have equipment for molding more viscous types of polymers, to provide an adapter for use with existing molding equipment so that the new types of polymers can be utilized without great expense being incurred. It is toward this adaptation that the present invention is directed.

SUMMARY OF THE PRESENT INVENTION

Accordingly it is an object of the present invention to provide an adapter for polymer molding systems which will allow use of low viscosity polymeric materials in conventional systems. In accordance with this and other objects there is provided by the present invention an adapter for injection of low viscosity polymeric material into a mold cavity which adapter comprises a housing having sealing means at its ejection end to seal against a mold portion surrounding the injection port to the mold cavity. The other end of the housing is adapted to be clamped to suitable equipment for urging the adapter into such sealing contact with the mold. The housing also contains evacuation means for effecting evacuation of the mold cavity when the sealing means is positioned in sealing contact with the mold and injection means for selectively injecting polymeric material into the injection port of the mold cavity while the cavity is in evacuated condition. Further, if desired, a fluid jacket may be provided for controlling temperature of the polymeric material being injected into the mold by use of heating or cooling fluid being circulated through the jacket.

Thus, the adapter can be utilized for evacuating the mold, injecting the polymeric material into the mold, and controlling the temperature of the material being injected into the mold. Yet the device can be built relatively small and cheaply and is useful with conventional types of injection or transfer molding equipment without modification of the equipment or the molds designed for use with such equipment.

BRIEF DESCRIPTION OF THE DRAWINGS

Further objects and attendant advantages will become apparent to those skilled in the art from a reading of the following detailed description in conjunction with the accompanying drawings wherein.

DESCRIPTION OF PREFERRED EMBODIMENTS

Figure 1:
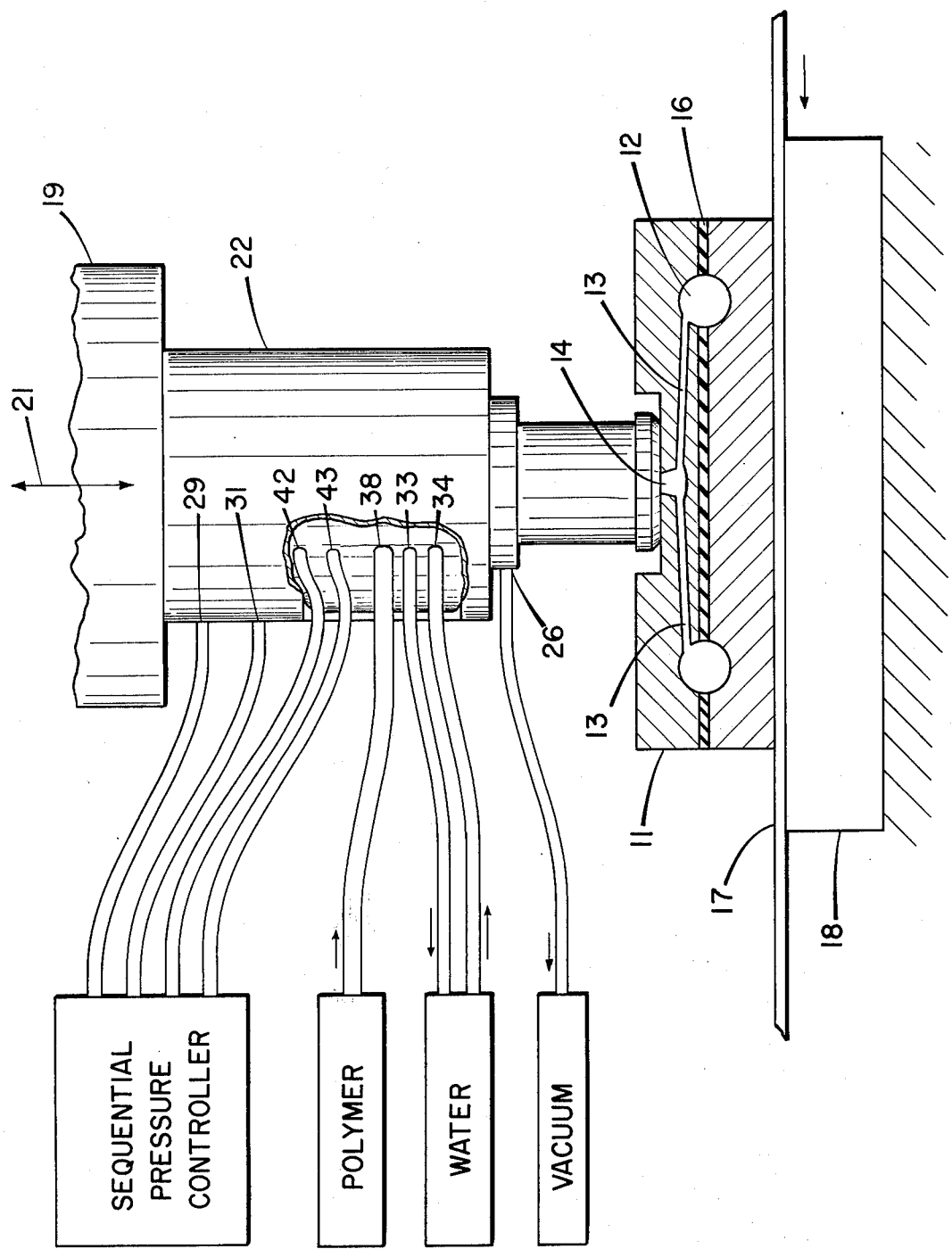
FIG. 1 is a schematic view of a molding system utilizing the adapter contemplated by the present invention.

Referring now to the drawings wherein like reference characters designate like or corresponding parts throughout the figures thereof there is shown in FIG. 1 a mold 11 having one or more cavities 12 therein which are designed to be filled by runners 13 communicating with an injection port 14 through which the polymeric material is introduced. As shown in the drawing the mold may be of the conventional two-part type which is eventually separable to eject the molded part after it has been cured. The mold per se forms no part of the present invention and any conventional mold which is or can be totally sealed for evacuation purposes is suitable for use with the present invention. In order to effectuate sealing, however, it is desirable that a thin gasket 16 be placed between the mold parts for purposes of ease in evacuation when a multiple-part mold is used.

As is typical of automated molding equipment the mold parts are carried past a molding station, for example, on a belt 17 with a rigid platform 18 supporting the belt at the molding station. Alternatively, other arrangements such as, for example, turntable type arrangements as are known conventionally can be used. The unfilled mold 12 enters the molding station on the moving belt 17 while the molding equipment 19 is held in a retracted position to allow clearance between the mold and the equipment. When the mold is in proper position it is stopped and the molding equipment 19 is urged downwardly as shown by the bi-directional arrow 21 into contact with the inlet port 14 of the mold cavity. Such conventional equipment forms no part of the present invention as such and therefore need not be described in detail herein.

In accordance with the present invention when liquid polymers are used an adapter 22 is clamped in the molding equipment 19 and has its injection end urged by the molding equipment 19 into contact with the mold 11.

Figure 2:
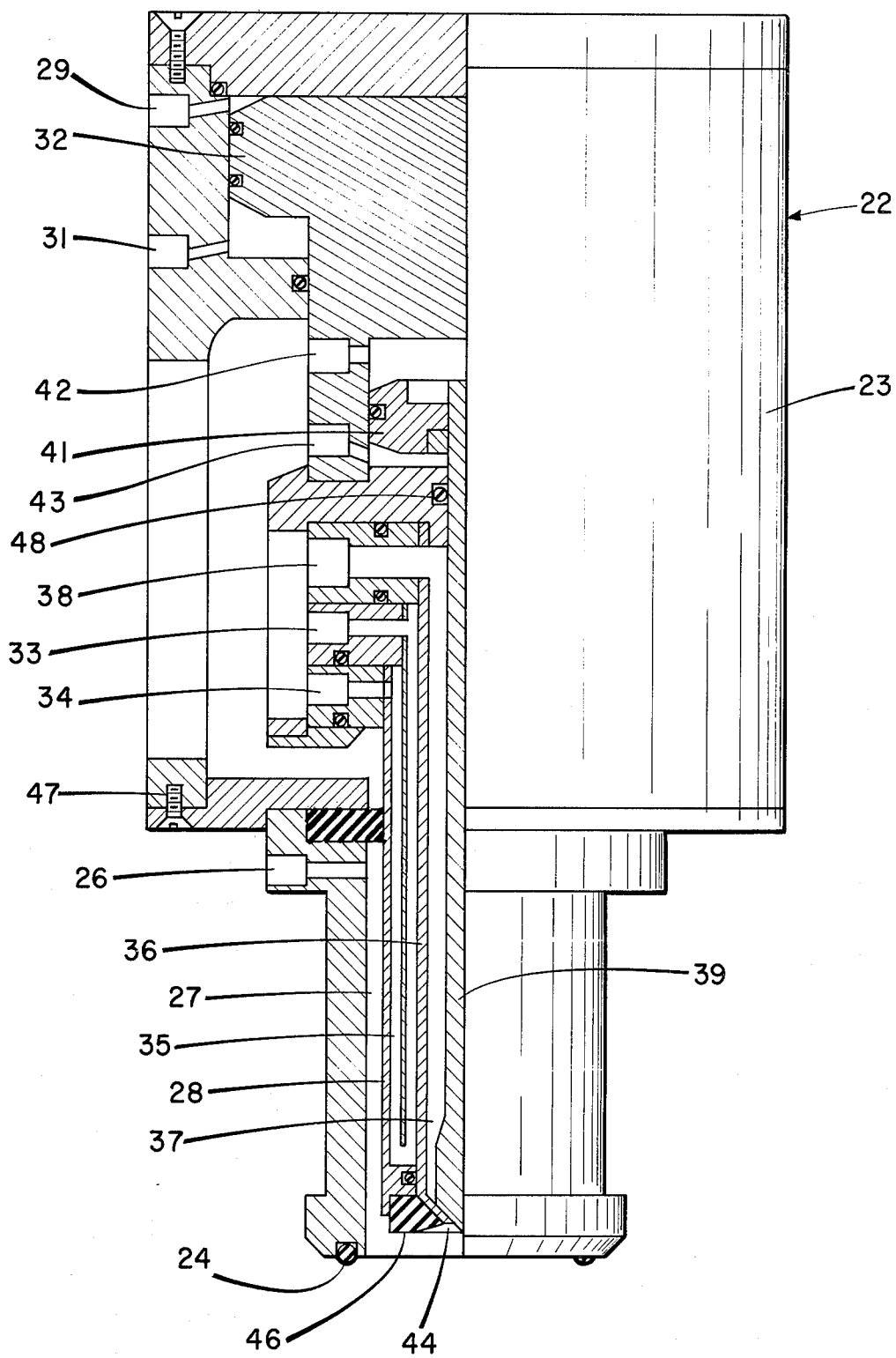
FIG. 2 is a plan view in half-cross section showing the details of the adapter shown somewhat diagrammatically in FIG. 1.

Referring now to FIG. 2 of the drawings the adapter 22 comprises a housing 23 having peripherally mounted at its exit end a sealing ring 24 designed to be urged into sealing contact with the area of the mold surface surrounding the inlet port 14 for purposes of evacuating the mold cavity. For this purpose an inlet port 26 communicating with an exhaust manifold 27 is provided in the housing. An injection barrel 28 defines the inner periphery of the manifold 27 and is slidably mounted within the housing 23. Air pressure ports 29 and 31 are provided for actuating a piston 32 to control movement of the barrel 28. Thus, upon application of fluid pressure to the port 29 the piston 32 and the barrel 28 connected thereto are moved downwardly and similarly upon application of pressure to the inlet port 31 the barrel 28 is moved upwardly. The barrel 28 has disposed in the lower portions thereof a temperature controlling means comprising a fluid jacket 35 fed by means of an inlet port 33 and an outlet port 34 through which hot or cold water, for example, can be circulated. Depending upon the type of polymer used in some instances this temperature control means may not be necessary but it is desirable to provide it on the adapter for those situations when it is needed. The inner boundary of the temperature control means 35 is the cylindrical wall 36 which forms the polymer conduit 37 which is supplied by a polymer inlet port 38. Movably disposed within the conduit 37 is a needle 39 arranged to be raised or lowered by means of a piston 41 operated by pressure supplied through ports 42 and 43. The needle 39 in its lower position closes an exit port 44 preferably formed by tapering inwardly the end of the wall 36. Mounted circumferentially around the exit port 44 is a compressable sealing ring 46 designed to be urged into contact with the mold in the area surrounding the mold injection port to prevent flow of polymeric material into the exhaust system 27.

The bottom of the housing 23 is preferably made separable from the upper portions of the housing with the two portions bolted together by means such as screws 47. In the instance where the housing is made separable in this manner a lower portion of the housing may be removed from the upper portion and the entire unit disassembled for purposes of cleaning should such steps become necessary. For this purpose sealing rings such as that shown at 48 are used throughout the device so that mechanical clearances may be sufficiently wide for ease in disassembly and re-assembly without sacrificing the necessary sealing relationship between the various parts of the device.

Figure 3A:
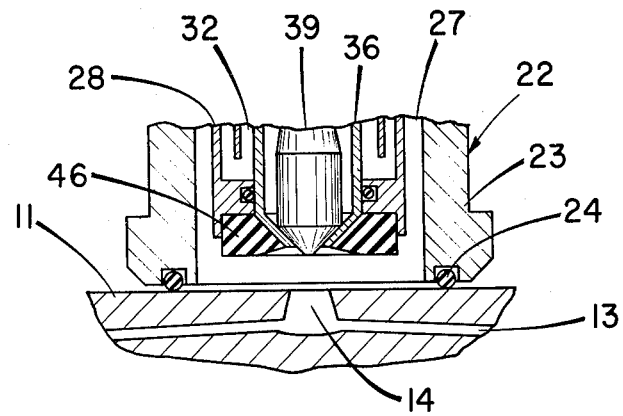
FIGS. 3 A, B, and C illustrate various positions of the elements of the injector shown in FIG. 1 and FIG. 2 for evacuating the mold and for injecting material into the mold while maintaining it in evacuated condition.
Figure 3B:
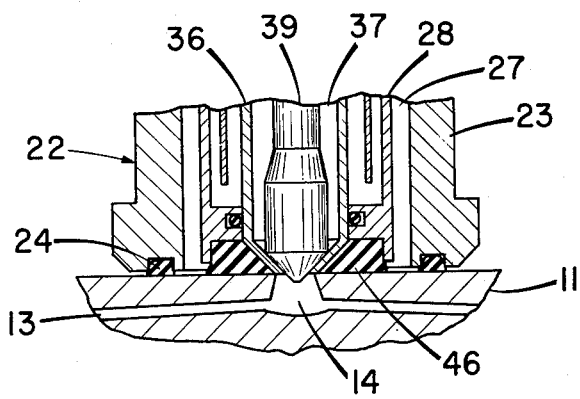
Figure 3C:
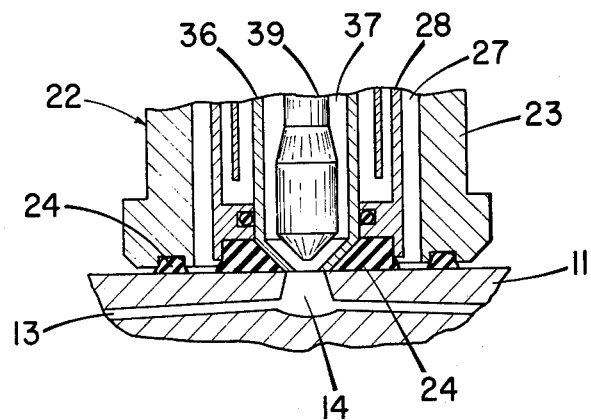

The actual operation of the device may be better understood by references to FIGS. 3A, 3B and 3C. As pointed out previously with respect to FIG. 1 the adapter 22 is initially held in a retracted position as shown in FIG. 1 by the upward pointing double-ended arrow 21 by virtue of a suitable reciprocal motion device 19. The mold 11 moves into position under the adapter 22 and the equipment 19 pushes the adapter 22 downward into contact with the mold; the sealing ring 24 sealing the area around the mold injection port 14. At this point the barrel 28 is held in a retracted position as shown in FIG. 3A allowing communication between the exhaust manifold 27 and the mold inlet port 14.

A vacuum is then pulled on the mold to exhaust the same while the barrel is so positioned. When the mold has been exhausted as shown in FIG. 3B the barrel 28 is urged downwardly by application of pressure to port 29 until the sealing ring 46 effectively isolates the mold inlet port 14 from the exhaust manifold 27. At this point as shown in FIG. 3C the needle valve is opened by upward movement of the needle 39 caused by application of pressure to the port 43 to raise the piston 41. Polymer is allowed to flow into the inlet port 14 of the mold and the mold cavity is filled. Then the needle valve is again repositioned to close the ejection port of the device, the barrel 28 is raised, and the entire adapter 22 is raised away from the mold so that the mold can be sequenced to its curing station and the next mold positioned under the device whereupon the sequence is repeated.

Obviously, many modifications and variations of the embodiment disclosed herein will become obvious to those skilled in the art from a reading of the above detailed description. It is to be understood therefore that within the scope of the appended claims the invention may be practiced otherwise than as specifically described.

That which is claimed is:

1. An adapter for injection of low viscosity polymeric material into a mold cavity comprising:
   a housing having sealing means at an exit portion thereof for effectuating an air tight seal between said exit portion and a mold portion surrounding an injection port to the cavity of said mold,
   evacuation means in said housing for effecting evacuation of the mold cavity when said sealing means is positioned in sealing contact with said mold, and
   injection means in said housing for selectively injecting said polymeric material into the injection port of said mold cavity while the cavity is in evacuated condition; said injection means including a flow control valve at the exit portion of said housing and a first fluid operated piston in said housing for selectively operating said valve and further including a selectively operable isolation means surrounding the injection port and carried by the housing for preventing back flow of polymeric material into said evacuation means.

2. An adapter as defined in claim 1 wherein said isolation means includes a deformable sealing gasket surrounding said valve and a second fluid operated piston for selectively urging the gasket into sealing contact with the mold around the portion surrounding the mold injection port.

3. An adapter as defined in claim 2 wherein said housing is substantially cylindrical and said first and second fluid operated pistons are concentrically mounted around the axis of said housing; said valve being located on the center of the cylindrical configuration.

4. An adapter as defined in claim 3 wherein said evacuation means comprises a cylindrical space concentric with said valve and wherein said sealing means comprises an O-ring mounted on the end of said housing concentrically around said cylindrical space.

5. An adapter as defined in claim 4 and further including in said housing temperature control means for controlling temperature of the polymeric material.

6. An adapter as defined in claim 5 wherein said temperature control means includes a water jacket.

7. An adapter as defined in claim 1 and further including in said housing a water jacket for controlling temperature of the polymeric material.

* * * * *